United States Patent [19]
Kawaguchi

[11] 3,741,483
[45] June 26, 1973

[54] COMBUSTION AIR SUPPLY ARRANGEMENT FOR GAS TURBINES
[75] Inventor: Katsuyuki Kawaguchi, Akashi, Japan
[73] Assignee: Mitsubishi Jukogyo Kabushiki Kaisha, Tokyo, Japan
[22] Filed: Dec. 10, 1971
[21] Appl. No.: 206,621

[52] U.S. Cl.............. 239/400, 239/406, 239/424.5, 60/39.74 R
[51] Int. Cl............................................. B05b 7/10
[58] Field of Search............... 60/39.74 R; 239/400, 239/403, 404, 405, 406, 424.5

[56] References Cited
UNITED STATES PATENTS
| | | | |
|---|---|---|---|
| 3,630,024 | 12/1971 | Hopkins | 60/39.74 R |
| 3,498,055 | 3/1970 | Faitani et al. | 60/39.74 R |
| 2,575,264 | 11/1951 | Feilden | 60/39.74 R |
| 2,965,303 | 12/1960 | Jackson | 60/39.74 R |
| 3,121,996 | 2/1964 | Smith | 60/39.74 R |
| 3,285,007 | 11/1966 | Carlisle et al. | 60/39.74 R |

FOREIGN PATENTS OR APPLICATIONS
276,515  10/1951  Switzerland................... 60/39.74 R Primary Examiner—M. Henson Wood, Jr.
Assistant Examiner—John J. Love
Attorney—John J. McGlew and Alfred E. Page

[57] ABSTRACT

The combustion chamber of a gas turbine has a mixture of air and fuel sprayed thereinto through an injection nozzle including a central passage for the fuel and annular passage and port means for air under pressure to spray the fuel into the combustion chamber in the form of a spray cone. Additional air is directed into the combustion chamber through a relatively large annular flow passage surrounding the fuel injection nozzle, and a whirler, in the form of a set of radial vanes disposed at a small angle to the direction of flow, is interposed in this channel. The vanes are mounted at their inner ends on an enlarged and elongated hub, and their outer ends are free. The circumferential wall of the hub defines, with the outer circumferential surface of the fuel injection nozzle, a relatively small annular flow passage. Openings in the wall of the hub upstream of the vanes allow air to flow into this latter annular passage and the air is discharged through a series of small diameter ports in an annular end wall of the hub arranged slightly in advance of the discharge end of the fuel injection nozzle. The ignition conditions at starting up of the turbine, under low flow rates of fuel and low air pressures, result in their being little excess air reaching the fuel injection spray cone through the pores. When running under load, as the fuel flow rate and the air pressure increase, the amount of smoke decreases with the injection of larger quantities of additional air through the ports and forming a stable vortex around the spray cone. The end result is a practically smokeless operation of the gas turbine both at start-up and during running under load.

5 Claims, 1 Drawing Figure

PATENTED JUN 26 1973　　3,741,483
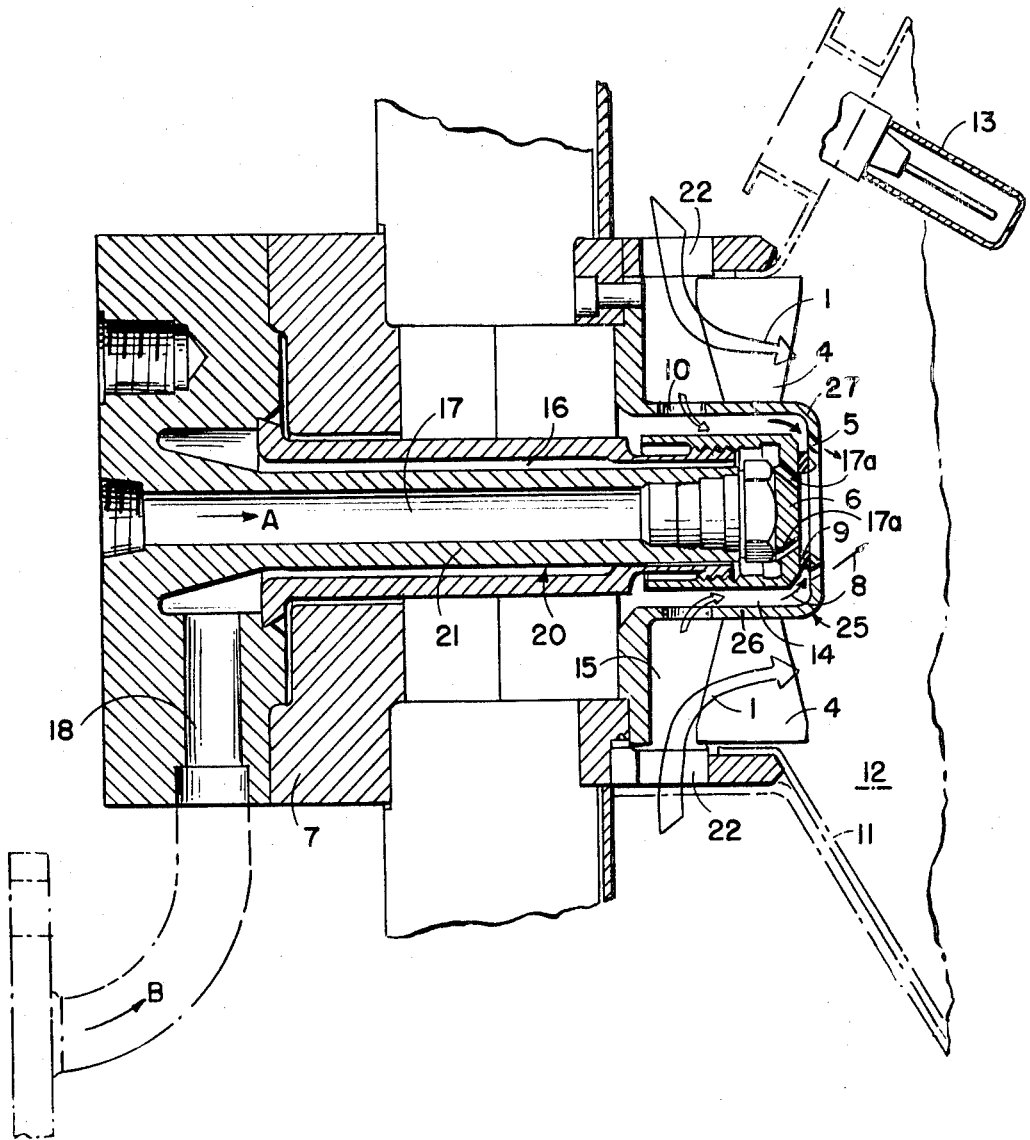
INVENTOR
KATSUYUKI KAWAGUCHI
by
John J. McGlew
ATTORNEY

COMBUSTION AIR SUPPLY ARRANGEMENT FOR GAS TURBINES

FIELD OF THE INVENTION

This invention relates to gas turbines and, more particularly, to a novel combustion air supply arrangement for gas turbines.

BACKGROUND OF THE PRIOR ART

The amount of smoke discharged by a gas turbine is easily reduced. Thus, the mixture ratio, that is the ratio of the combustion supporting air to the fuel gas, in the primary combustion zone, is increased, and the fuel gas particles are mixed evenly with the air so that there are no local spots of fuel richness. During running under load, the fuel gas spraying angle is reduced by the increase in pressure of the air, and the black smoke emitted by the turbine increases substantially. Surveys show that, near the center of the combustion in the primary combustion zone, the total air is decreased to less than 5 percent and carbon is generated substantially at the center line or axis of this zone.

There are three methods which are applicable to prevent smoke discharge by a gas turbine. The first method is to supply a large amount of air to the vicinity of the fuel injection valve or nozzle, since the fuel is inevitably enriched and the air-fuel ratio is below 13.5/1, which is the theoretically ideal mix ratio for complete combustion. The second procedure is to improve the mixing of the fuel gas particles with the air in the vicinity of the axis or the center line of the spray cone of fuel and air mixture. The third procedure is to impart rotational energy to the air and fuel gas particles, since an increase in the pressure leads to reduction of the fuel gas spraying angle and, as a result, to an increase in the amount of smoke.

A swirler-type of combustor, instead of the conventional baffle-type combustor, is required to carry out the three procedures mentioned above. Of conventional combustors, the baffle-type of smokeless combustor cannot possibly deliver a large amount of air to the primary combustion zone, and therefore cannot reduce the amount of smoke to the extent of providing smokeless operation, although this type of combustor is quite excellent as regards combustion stability.

In the swirler-type of smokeless combustor, the air flow can be improved, with reduction of smoke, by flowing the air through vanes arranged at a small angle to the direction of flow. However, such a simple type of swirler is not practically applicable, because of difficulty in ignition and tendency to blow out the flame.

For this reason, three procedures are necessary to make a swirler-type of smokeless combustor suitable for practical use. The first is to provide a proper form of combustor characterized by easy ignition and improved smoke characteristics, by selecting and combining the swirler vane angle and the form and number of scoops at air vents on the side of the inner cylinder. The second factor is to reduce the smoke level by, at the start of ignition, using the primary burner with the fuel gas spraying angle being reduced so that ignition is made easy and the combustion stability is increased. When a constant velocity is reached, the spray angle is increased, using a secondary burner. The third factor is to reconstruct the fuel injection valve or nozzle to provide a primary injection, at a small spray angle, and a secondary injection at a large spray angle.

The use of the primary burner, as mentioned above with respect to the second factor, is easy and effective for a mono-cylindrical gas turbine, but is difficult for the annular type of cylindrical combustor. The third solution mentioned above is applicable provided that the fuel injection valve is designed in the duplex form such as used in jet engines. In this case, however, improvements are required for the fuel system and the control system.

SUMMARY OF THE INVENTION

The present invention is directed to a smokeless combustion system for a gas turbine using an air spray type of simplex fuel injection valve or nozzle, such as frequently used in gas turbines for land vehicles. The objective of the present invention is to provide a combustor or combustion arrangement for a gas turbine which is free from the disadvantage of smoke discharge due to localized fuel richness in such a simplex injection valve or nozzle. Additionally, the present invention is directed to a combustion apparatus for gas turbines having improved ignition or start-up and reduced smoke level during running under load.

In accordance with the invention, a plurality of holes are formed around the circumference of a tubular or cylindrical hub mounting radially extending swirler vanes arranged at relatively small angles to the direction of air flow, and a plurality of pores communicating with these holes are arranged around the fuel injection outlet of the fuel injection valve or nozzle which is surrounded by an elongated cylindrical portion of the hub. This elongated portion of the hub defines an annular space around the exterior cylindrical surface of the fuel injection valve or nozzle and disposed substantially intermediate the circumferential line of the pores and the circumferential line of the holes.

In a swirler-type of smokeless combustion arrangement, positioning of the swirler vanes at a small angle leads to a reduced smoke level but also unfavorable firing or combustion. Consequently, the hub diameter of the swirler, in accordance with the invention, is enlarged, and smoke is reduced by forming a stable air vortex around the spray cone discharged by the injection nozzle or valve by the rotating air flow extending along the boss surface and through the vanes. A radial type of swirler is used to improve the firing, and air is injected into the fuel-air spray cone through a plurality of air-spraying pores arranged around the discharge end of the injector nozzle or valve, during running under load.

An object of the invention is to provide an improved air supply arrangement for gas turbines.

Another object of the invention is to provide such an air supply arrangement in which the production or emission of smoke is very greatly reduced.

A further object of the invention is to provide such an air supply arrangement or system which results in effective smokeless operation of a gas turbine both during start-up and during running under load.

For an understanding of the principles of the invention, reference is made to the following description of a typical embodiment thereof as illustrated in the accompanying drawing.

BRIEF DESCRIPTION OF THE DRAWING

In the drawing, the single FIGURE is a partial axial sectional view through the fuel supply system, air supply system and part of the combustion chamber of a gas turbine, incorporating the air supply system of the invention.

DESCRIPTION OF THE PREFERRED EMBODIMENT

Referring to the drawing, part of the casing of a combustion chamber 12, for a gas turbine, is indicated at 11, and a suitable ignition device for igniting the air gas fuel mixture and maintaining burning thereof is indicated at 13. The fuel is supplied into the combustion chamber through a supply element 20 having a central passage 17 for the flow of fuel to the discharge nozzle 6. The supply element 20 is of standard or usual construction, and air under pressure is supplied from a suitable source, as indicated by the arrow B, to flow into a passage 18 leading to or communicating with an annular passage or circumferentially spaced passages 16 surrounding the inner tube 21, passages 16 delivering the air under pressure for discharge through inwardly converging ports 17a at the nozzle 6 of the injection valve 20. The air discharged under pressure through ports 17a mixes with the fuel flowing through passage 17a in the direction of the arrow A, such fuel being preferably a gas although a liquid fuel may be used, so that a spray cone of fuel-air mixture is discharged into the combustion chamber 12.

Additional air is supplied through ports 22 to flow into a large diameter annular passage 15 and past swirler vanes 4, as indicated by the arrows 1. The swirler blades 4 extend radially from a relatively large diameter hub 25, and their outer ends are free of attachment to any shroud or the like. Blades 4 are arranged at a slight angle to the direction of air flow therethrough, so as to impart a swirling motion to the air flowing past these blades and delivered into the combustion chamber 12. Hub 25 has a cylindrical wall 26 spaced from the outer peripheral surface of the supply element 20 to define an annular chamber 14 between cylindrical wall 26 and the outer surface of element 20. A sealing member 9 is interposed between a radially inwardly extending flange 27, on the end of hub 25, and the nozzle 6, to close off annular chamber 14 at the forward end. A spacer 7 is provided to set the proper position of supply element 20.

In accordance with the invention, a series of circumferentially spaced holes are formed through wall 26 of hub 25 to establish communication between chambers 14 and 15. Thus, part of the air flowing into the chamber 15 flows through holes or apertures 10 into the relatively small diameter annular chamber 14 and thus is delivered to a series of circumferentially spaced ports 5 formed in flange 27 radially outwardly of sealing member 9. The axes of ports 5 converge toward the axis of nozzle 6. The chamber 14 is disposed radially midway between the circle of ports 5 and the wall 26 of hub 25. The mixing air flow is indicated by the arrow 8.

The radial vane swirler with the blades 4, which do not have any shroud surrounding their tips, has a suitably enlarged hub diameter. This swirler allows the air to flow, in a swirling fashion, over the circumferential surface or wall 26 of hub 25 and to be discharged, as a whirling air stream, into combustion chamber 12 and radially outwardly of the spray cone provided by the discharge nozzle 6. The air flow forms a stable vortex in combustion chamber 12 to attain fuel-richness at the fuel-air spray cone in the chamber, thus to improve ignition and the stability of combustion. The angle of the vanes 4 is decreased without raising the smoke level, so that ignition stability is increased.

The air spraying pores 5, which are a plurality of pores having a selected size, do not have any detrimental effect on the ignition condition at start of the turbine, where the fuel flow rate and the air pressure are relatively small. This is because there is little air for combustion reaching the fuel injection spray cone through pores 5. During running under load, as the fuel flow rate and the air pressure increase, the amount of smoke decreases with the injection of mixing air into the fuel-enriched spray cone, as represented by the arrow 8.

Experimental results show that the Bacharach Smoke Number decreases by 0.5 at inner cylindrical pressures of 2.0 Kg/cm$^2$. When running under load, the pressure increases to 6 – 7 Kg/cm$^2$, and the quantity of black smoke decreases at a much greater rate. The arrangement of the invention makes it possible to reduce the amount of black smoke emitted by the turbine both during running under load, as well as to improve the ignition and the combustion stability.

While a specific embodiment of the invention has been shown and described in detail to illustrate the application of the principles of the invention, it will be understood that these principles may be embodied otherwise without departing from such principles.

What is claimed is:

1. In a combustible mixture supply arrangement for gas turbines, of the type including a discharge nozzle discharging a spray cone of a fuel-air mixture under pressure into a turbine combustion chamber for ignition and combustion therein, and means directing an additional air flow into the combustion chamber in surrounding relation to the spray cone, the improvement comprising, in combination, means imparting a swirling motion to the additional air as it enters the combustion chamber, to form a stable air vortex in said combustion chamber surrounding said spray cone; and passage means connected to said directing means and operable to direct a portion of said additional air into said combustion chamber as a converging jet within said vortex and surrounding said spray cone; said means imparting a swirling motion to the additional air comprising a series of radial vanes arranged on a hub substantially concentric with said discharge nozzle and oriented at an angle to the direction of air flow therethrough, said hub having a diameter substantially larger than said discharge nozzle and having a cylindrical wall spaced from the peripheral surface of said discharge nozzle to define, with the latter, an annular passage, constituting said passage means; said passage means further including apertures in the cylindrical wall of said hub and through which at least a portion of the additional air flows into said annular passage; said hub having a radially inwardly directed flange at its end toward said combustion chamber; means sealing said flange relative to said discharge nozzle; said flange being formed with ports communicating with said annular passage for directing said portion of said additional air into said combustion chamber as a converging jet within said vortex and surrounding said spray cone.

2. In a combustible mixture supply arrangement, the improvement claimed in claim 1, in which said apertures are arranged around said cylindrical wall in substantially uniformly spaced circumferential arrangement; said pores being arranged around said flange in substantially uniformly spaced annular relation; the flow areas of said pores being substantially less than the flow areas of said apertures.

3. In a combustible mixture supply arrangement, the improvement claimed in claim 2, in which the axes of said ports converge, in the direction of said combustion chamber, toward the axis of said discharge nozzle.

4. In a combustible mixture supply arrangement, the improvement claimed in claim 3, in which said radial vanes have free radially outer ends free of connection to each other.

5. In a combustible mixture supply arrangement, the improvement claimed in claim 4, in which the annular flow area of said annular passage has a small magnitude such that, upon starting of the gas turbine, the amount of air flowing through said pores, under the fuel flow rate and air flow pressure during starting, is very small; the air flow rate through said pores increasing substantially with increasing air flow pressure of said additional air responsive to the turbine running under load.

* * * * *